(12) United States Patent
Katoh et al.

(10) Patent No.: US 10,449,914 B2
(45) Date of Patent: Oct. 22, 2019

(54) METHOD FOR MANUFACTURING GROMMET, AND GROMMET

(71) Applicant: YAZAKI CORPORATION, Tokyo (JP)

(72) Inventors: Shingo Katoh, Shizuoka (JP); Yasuhiro Kominato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 47 days.

(21) Appl. No.: 15/589,744

(22) Filed: May 8, 2017

(65) Prior Publication Data

US 2017/0349123 A1   Dec. 7, 2017

(30) Foreign Application Priority Data

Jun. 3, 2016  (JP) .................................. 2016-111631

(51) Int. Cl.
 *H01B 17/00* (2006.01)
 *B60R 16/02* (2006.01)
 (Continued)

(52) U.S. Cl.
 CPC ....... *B60R 16/0222* (2013.01); *H01B 17/583* (2013.01); *H02G 3/088* (2013.01);
 (Continued)

(58) Field of Classification Search
 CPC ............ G10K 11/168; B32B 17/10761; B32B 27/306; B32B 27/08; B32B 7/02;
 (Continued)

(56) References Cited

U.S. PATENT DOCUMENTS

2002/0036097 A1   3/2002   Okuhara et al.
2002/0036098 A1   3/2002   Okuhara et al.
(Continued)

FOREIGN PATENT DOCUMENTS

JP        55-79622 U    6/1980
JP     H01-068625 U1    5/1989
(Continued)

OTHER PUBLICATIONS

JP 2012-139086 English Translation hereinafter Suzuki; published in 2012.*

(Continued)

*Primary Examiner* — Pete T Lee
(74) *Attorney, Agent, or Firm* — Kenealy Vaidya LLP

(57) ABSTRACT

A method for manufacturing a grommet, which is fixed to a wire harness W inserted into an opening portion of a panel P and which is fitted and attached to the opening portion to thereby support the wire harness W on the panel P. The grommet includes peripheral walls that surrounds the wire harness W to form a sound shield space S around the wire harness W, and a soundproof wall that is formed in the sound shield space S so as to cross a longitudinal direction of the wire harness W. The soundproof wall is designed by use of an expression of $TL=20\log(\rho \times f)-42.5$ where TL designates transmission loss of the soundproof wall, $\rho$ designates surface density of the soundproof wall, and f designates a frequency.

12 Claims, 12 Drawing Sheets

(51) Int. Cl.
  *H01B 17/58* (2006.01)
  *H02G 3/38* (2006.01)
  *H02G 3/08* (2006.01)
  *B60R 16/037* (2006.01)
  *H01B 17/56* (2006.01)
  *H02G 3/22* (2006.01)

(52) U.S. Cl.
  CPC .............. *H02G 3/38* (2013.01); *B60R 16/02* (2013.01); *B60R 16/0373* (2013.01); *H01B 17/56* (2013.01); *H02G 3/22* (2013.01)

(58) Field of Classification Search
  CPC .......... B32B 2419/00; B32B 2307/102; B32B 2331/04; B32B 2605/00
  See application file for complete search history.

(56) References Cited

U.S. PATENT DOCUMENTS

| 2011/0079417 | A1* | 4/2011 | Okuhara | B60R 16/0222 174/152 G |
|---|---|---|---|---|
| 2017/0179703 | A1 | 6/2017 | Kominato et al. | |

FOREIGN PATENT DOCUMENTS

| JP | 9-219123 | A | 8/1997 |
| JP | 2001-153270 | A | 6/2001 |
| JP | 2002-27641 | A | 1/2002 |
| JP | 2002-171644 | A | 6/2002 |
| JP | 2012-125002 | A | 6/2012 |
| JP | 2014-50153 | A | 3/2014 |
| WO | 2016/043245 | A1 | 3/2016 |

OTHER PUBLICATIONS

Suzuki etal. (JP2012-139086 English Translation hereinafter Suzuki) Published in 2012.*
Japanese Office Action for the related Japanese Patent Application No. 2016-111631 dated May 22, 2018.
Japanese Office Action for the related Japanese Patent Application No. 2016-111631 dated Nov. 6, 2018.

* cited by examiner

RESONANT AMPLIFICATION CONDITION

CANCELLING CONDITION

METHOD FOR MANUFACTURING GROMMET, AND GROMMET

CROSS REFERENCE TO RELATED APPLICATIONS

This application is based on and claims priority from Japanese patent application No. 2016-111631 filed on Jun. 3, 2016, the entire contents of which are incorporated herein by reference.

BACKGROUND OF THE INVENTION

1. Technical Field

The present invention relates to a method for manufacturing a grommet, and a grommet.

2. Background Art

A grommet in which an air layer is formed internally has been known as a grommet by which a wire harness passing through an opening portion of a panel can be supported on the panel (see Patent Literatures JP-A-2012-125002, JP-A-2001-153270, JP-A-2014-50153, and JP-A-2002-27641).

SUMMARY

As described above, in a grommet having an air layer, sound transmitted through the grommet can be suppressed by the air layer. In recent years, a cabin of a vehicle has been requested to have a higher degree of quietness. Thus, the grommet has been also requested to have higher soundproof performance. In order to enhance the soundproof performance in the aforementioned grommet, it is considered to increase thickness of a peripheral wall forming the air layer or to form the grommet out of a high density material. However, such a method makes the grommet larger in size and heavier in weight, and increases costs.

The present invention has been developed in consideration of the aforementioned situation. An object of the invention is to provide a method for manufacturing a grommet, and a grommet, capable of enhancing soundproof performance while suppressing costs and suppressing increase in size and weight.

In order to attain the foregoing object, a method for manufacturing a grommet according to the invention is characterized by the following configurations (1) to (4).

(1) A method for manufacturing a grommet, which is fixed to a wire harness inserted into an opening portion of a panel and which is fitted and attached to the opening portion to thereby support the wire harness on the panel, the grommet including:

a peripheral wall that surrounds the wire harness to form a sound shield space around the wire harness; and a soundproof wall that is formed in the sound shield space so as to cross a longitudinal direction of the wire harness; wherein:

the soundproof wall is designed by:

$$TL = 20 \log(\rho \times f) - 42.5$$

where TL designates transmission loss of the soundproof wall, $\rho$ designates surface density of the soundproof wall, and f designates a frequency.

(2) A method for manufacturing a grommet according to the configuration (1), wherein;

the soundproof wall is designed so that the transmission loss TL satisfies:

$$TL \geq 20$$

at least in a part of a frequency band not lower than 1,000 Hz and not higher than 4,000 Hz.

(3) A method for manufacturing a grommet, which is fixed to a wire harness inserted into an opening portion of a panel and which is fitted and attached to the opening portion to thereby support the wire harness on the panel, the grommet including:

a peripheral wall that surrounds the wire harness to form a sound shield space around the wire harness; and soundproof walls that are formed in the sound shield space so as to cross a longitudinal direction of the wire harness; wherein:

thickness of each of the soundproof walls and a number of the soundproof walls are designed so that a sound pressure level transmitted by the panel can be suppressed by at least 3 dB in a frequency band not lower than 1,000 Hz and not higher than 4,000 Hz in comparison with that in a case where the soundproof walls are absent.

(4) A method for manufacturing a grommet according to the configuration (1) or (3), the grommet further including:

a panel engagement portion that can be engaged with an inner circumferential edge of the opening portion of the panel; wherein:

the panel engagement portion includes a first side wall and a second side wall that are opposed to each other to form an engagement groove to which the panel can be fitted;

a first lip portion is formed in the first side wall so that the first lip portion can abut against a first surface of the panel to push the panel toward the second side wall; and a second lip portion is formed in the second side wall so that the second lip portion can abut against a second surface of the panel to push the panel toward the first side wall, the second surface being an opposite surface to the first surface.

In the method for manufacturing a grommet according to the aforementioned configuration (1), transmission loss of the soundproof wall is designed by the expression TL=20 log($\rho \times f$)−42.5 to manufacture the grommet. Thus, it is possible to flexibly design a reduction amount with which sound transmitted from one surface side of the panel to the other surface side through the opening portion of the panel can be reduced in the sound shield space. In addition, when the transmission loss of the soundproof wall is designed to have a proper value, it is possible to obtain the grommet capable of enhancing soundproof performance while suppressing costs and suppressing increase in size and weight in comparison with a case where thickness of a peripheral wall forming an air layer is increased or a grommet is formed out of a high density material in order to enhance the soundproof performance.

In the method for manufacturing a grommet according to the aforementioned configuration (2), the grommet is manufactured so that the transmission loss TL of the soundproof wall can satisfy TL≥20 at least in a part of a frequency band of a conversation range not lower than 1,000 Hz and not higher than 4,000 Hz corresponding to a frequency band of sound with which human beings speak. Accordingly, when the manufactured grommet is, for example, provided in a dash panel of a vehicle, sound in the frequency band of the conversation range not lower than 1,000 Hz and not higher than 4,000 Hz within an engine room can be surely suppressed from being transmitted into a cabin through the opening portion. Thus, a comfortable indoor space can be obtained.

In the method for manufacturing a grommet according to the aforementioned configuration (3), it is possible to obtain a grommet in which sound transmitted from one surface side of the panel to the other surface side through the opening portion of the panel can be reduced by the sound shield space, and can be further reduced on a large scale by the soundproof walls. In addition, the grommet is manufactured as follows. That is, the thicknesses and the number of the soundproof walls formed in the sound shield space are designed so that the transmission level of sound pressure can be suppressed by at least 3 dB in a frequency band of a conversation range not lower than 1,000 Hz and not higher than 4,000 Hz corresponding to a frequency band of sound with which human beings speak, as compared with a case where the soundproof walls are absent. Accordingly, when the manufactured grommet is, for example, provided in a dash panel of a vehicle, sound in the frequency band of the conversation range not lower than 1,000 Hz and not higher than 4,000 Hz within an engine room can be surely suppressed from being transmitted into a cabin through the opening portion. Thus, a comfortable indoor space can be obtained. In addition, it is possible to obtain the grommet capable of enhancing soundproof performance while suppressing costs and suppressing increase in size and weight in comparison with a case where thickness of a peripheral wall forming an air layer is increased or a grommet is formed out of a high density material in order to enhance the soundproof performance.

In the method for manufacturing a grommet according to the aforementioned configuration (4), it is possible to manufacture a grommet in which a first lip portion and a second lip portion are formed to push a first surface and a second surface of the panel when the grommet is attached to the panel, According to the grommet, vibration of the panel can be suppressed by the first lip portion and the second lip portion when the grommet is attached to the panel. Thus, sound transmitted by the panel can be reduced.

In order to attain the aforementioned object, a grommet according to the invention is characterized by the following configuration (5).

(5) A grommet which is fixed to a wire harness inserted into an opening portion of a panel and which is fitted and attached to the opening portion to thereby support the wire harness on the panel, the grommet including:

a peripheral wall that surrounds the wire harness to form a sound shield space around the wire harness;

a soundproof wall that is formed in the sound shield space so as to cross a longitudinal direction of the wire harness; and a panel engagement portion that can be engaged with an inner circumferential edge of the opening portion of the panel; wherein:

the panel engagement portion includes a first side wall and a second side wall that are opposed to each other to form an engagement groove to which the panel can be fitted;

a first lip portion is formed in the first side wall so that the first lip portion can abut against a first surface of the panel to push the panel toward the second side wall; and a second lip portion is formed in the second side wall so that the second lip portion can abut against a second surface of the panel to push the panel toward the first side wall, the second surface being an opposite surface to the first surface.

In the grommet according to the aforementioned configuration (5), sound transmitted from one surface side of the panel to the other surface side through the opening portion of the panel can be reduced by the sound shield space, and can be further reduced on a large scale by the soundproof wall. When the grommet is, for example, provided in a dash panel of a vehicle, sound within an engine room can be surely suppressed from being transmitted into a cabin through the opening portion.

Thus, it is possible to enhance soundproof performance while suppressing costs and suppressing increase in size and weight in comparison with a case where thickness of a peripheral wall forming an air layer is increased or a grommet is formed out of a high density material in order to enhance the soundproof performance.

In addition, when the grommet is attached to the panel, the first lip portion and the second lip portion push the first surface and the second surface of the panel respectively so that vibration of the panel can be suppressed. Thus, sound transmitted by the panel can be reduced.

Advantage of the Invention

According to the invention, it is possible to provide a method for manufacturing a grommet, and a grommet, capable of enhancing soundproof performance while suppressing costs and suppressing increase in size and weight.

The invention has been described briefly above. The further details of the invention will be made clearer if the following Mode for Carrying Out the Invention (hereinafter referred to as "embodiment") is read through with reference to the accompanying drawings.

DETAILED DESCRIPTION OF EMBODIMENTS

A specific embodiment of the invention will be described below with reference to the drawings.

Figure 1:
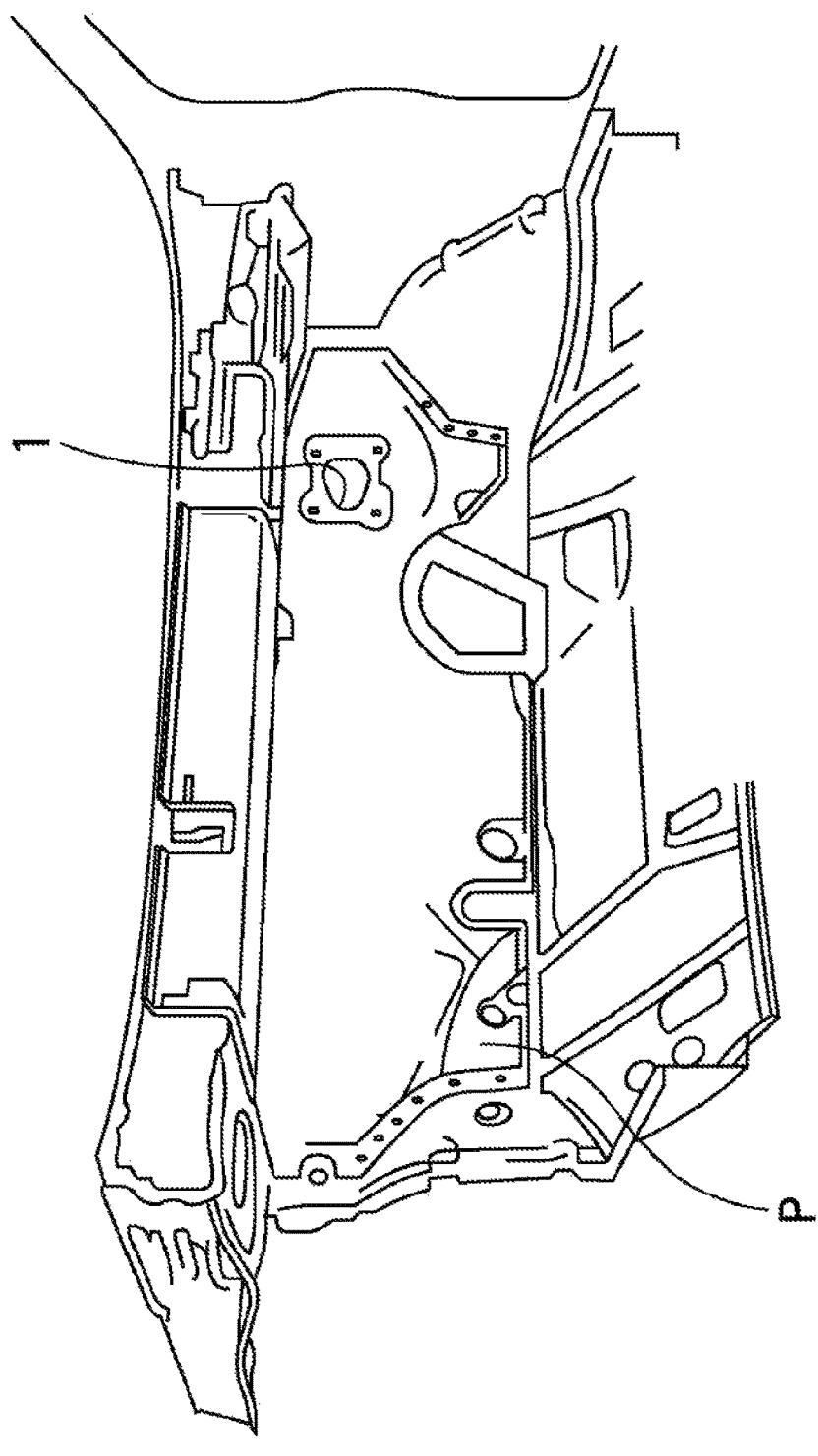
FIG. 1 is a perspective view of a dash panel to which a grommet will be attached.
Figure 2:
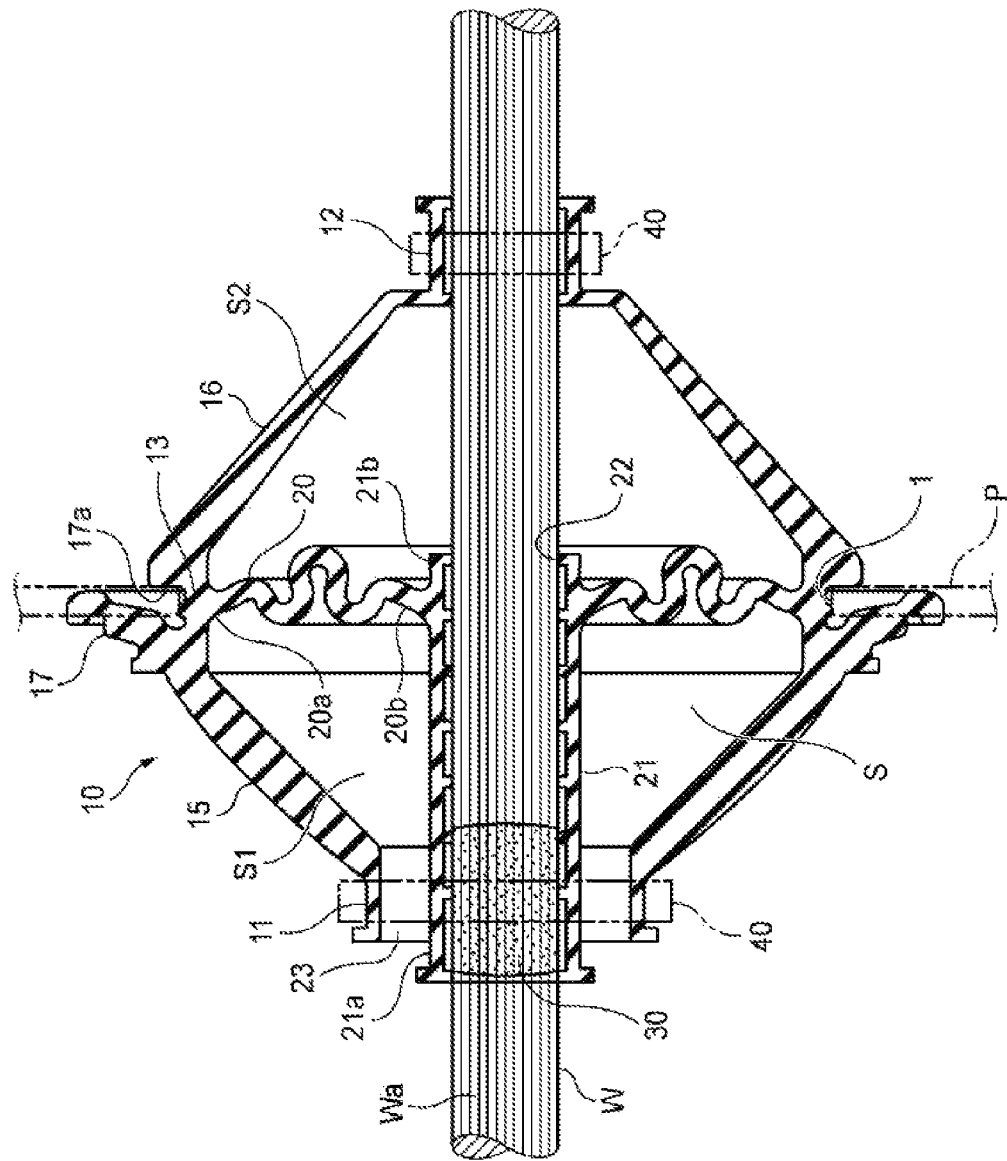
FIG. 2 is a sectional view of a grommet according to an embodiment of the invention.

FIG. 1 is a perspective view of a dash panel to which a grommet will be attached. FIG. 2 is a sectional view of a grommet according to an embodiment of the invention.

As shown in FIG. 1 and FIG. 2, a grommet 10 according to the embodiment is attached to a panel P such as a dash panel installed in a vehicle such as a car. The panel P is provided between an engine room and a cabin. An opening portion 1 is formed in the panel P so that a wire harness W can be inserted into the opening portion 1. Thus, the wire harness W is wired over front and rear surfaces of the panel P. For example, the wire harness W has a configuration in which an electric wire bundle has been passed through a tubular packaging.

The grommet 10 is formed integrally out of an elastic material such as rubber or elastomer. The grommet 10 is fixed to the wire harness W inserted into the opening portion 1 of the panel P. The grommet 10 is fitted into the opening portion 1 and attached to the panel P so that the wire harness W can be supported on the panel P.

The grommet 10 has a fitting portion 13, two peripheral walls 15 and 16, an inner cylindrical portion 21, and a soundproof wall 20. The fitting portion 13 is fitted into the opening portion 1 of the panel P. The peripheral walls 15 and 16 extend on axially opposite sides from the fitting portion 13. Each of the peripheral walls 15 and 16 has a shape like a tapered cylinder. The inner cylindrical portion 21 is disposed on the inner circumferential side of the peripheral walls 15 and 16. The inner cylindrical portion 21 is tightly fitted to the outer circumference of the wire harness W. The soundproof wall 20 is provided on the inner circumference of the fitting portion 13 and in a direction crossing the wire harness W.

The diameter of each of the two tapered cylindrical peripheral walls 15 and 16 is reduced gradually as it goes away from the fitting portion 13. At the inner circumferential end with the small diameter, the peripheral wall 15, 16 has a small diameter cylindrical portion 11, 12. The small diameter cylindrical portion 11, 12 is a part disposed closely to or in tight contact with the outer circumference of the wire harness W. A sound shield space S is formed around the wire harness W by the two tapered cylindrical peripheral walls 15 and 16.

An end portion 21a on one axial side (outside of the cabin environment side, such as the engine room side) of the inner cylindrical portion 21 is inserted into the small diameter cylindrical portion 11 at the inner circumferential end of the peripheral wall 15 so as to secure an annular gap 23 on the inner side of the small diameter cylindrical portion 11. Incidentally, the gap 23 may be closed with a tie band or tape 40 or the like, as will be described later.

The inner cylindrical portion 21 extends continuously over one side half of axial length between the opposite inner circumferential ends (small diameter cylindrical portions 11 and 12) of the two tapered cylindrical peripheral walls 15 and 16. An end portion 21b (corresponding to the position of the panel P) on the opposite side to the end portion inserted into the small diameter cylindrical portion 11 at the inner circumferential end of the peripheral wall 15 has an open end 22 which is open into the sound shield space S.

The soundproof wall 20 is disposed inside the sound shield space S. An outer circumferential end 20a of the soundproof wall 20 is connected to the inner circumference of the fitting portion 13, and an inner circumferential end 20b is connected to the inner cylindrical portion 21. Thus, the sound shield space S is divided into two sound shield space parts S1 and S2 axially by the soundproof wall 20. Incidentally, it is most desirable that the soundproof wall 20 is connected to, of the inner circumference of the fitting portion 13, a position corresponding to the panel P. However, the soundproof wall 20 may be connected to, of the inner circumference of the peripheral wall 15 or 16, a position close to the position corresponding to the panel P. In addition, the soundproof wall 20 is formed as an annular corrugated wall. The corrugated wall means an annular wall plate formed into a corrugated shape made of concentric circles. The corrugated shape may include a bellows-like shape. Incidentally, the soundproof wall 20 may have a flat plate-like shape as shown in Modifications 3 and 4, which will be described later.

The grommet 10 has a panel engagement portion 17 in the outer circumference of the fitting portion 13. The panel engagement portion 17 has an annular engagement groove 17a as a panel fixation portion to be fixed to an inner circumferential edge of the opening portion 1 of the panel P.

Figure 3:
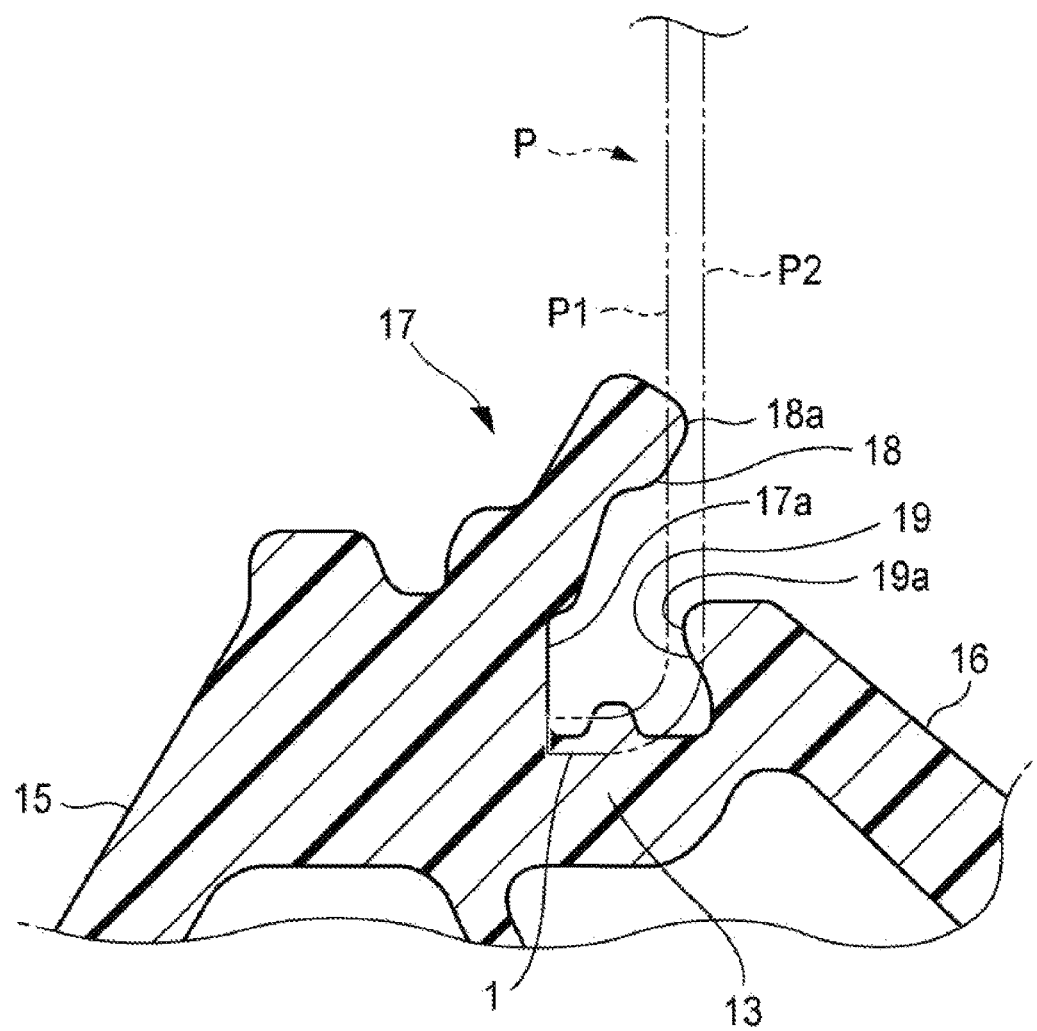
FIG. 3 is a sectional view in a fitting portion to be fitted into an opening portion of the panel.

FIG. 3 is a sectional view in the fitting portion 13 to be fitted into the opening portion of the panel.

As shown in FIG. 3, the panel engagement portion 17 has a first side wall 18 and a second side wall 19, the first side wall 18 and the second side wall 19 forming the engagement groove 17a, In a state where the grommet 10 has been fitted into the opening portion 1 of the panel P, the first side wall 18 is located on a side of a first surface P1 of the panel P, which is a surface on the engine room side, and the second side wall 19 is located on a side of a second surface P2 of the panel P, which is a surface on the cabin side. A first lip portion 18a is formed in the first side wall 18 so that the first lip 18a can abut against the first surface P1 to push the panel P toward the second side wall 19. A second lip portion 19a is formed in the second side wall 19 so that the second lip 19a can abut against the second surface P2 to push the panel P toward the first side wall 18. Incidentally, FIG. 3 shows the shape of the grommet 10 which has not been fitted to the panel P, in order to make it easy to understand the shapes of the first lip portion 18a and the second lip portion 19a.

The grommet 10 is attached to the wire harness W as follows. That the wire harness W is inserted into the inner cylindrical portion 21 and one small diameter cylindrical portion 12, and the tie band or tape 40 or the like is wound around the small diameter cylindrical portion 12 so as to fix the small diameter cylindrical portion 12 to the wire harness W. In addition, the tie band or tape 40 is wound around the other small diameter cylindrical portion 11 located outside the inner cylindrical portion 21, so as to fix the small diameter cylindrical portion 11 to the wire harness W from above the inner cylindrical portion 21. In this manner, the grommet 10 is fixed to the wire harness W.

Incidentally, before or after the wire harness W is installed in the grommet 10, it is preferable that a water sealing portion 30 is provided inside the inner cylindrical portion 21. In the water sealing portion 30, water sealant such as silicone is charged into gaps among electric wires Wa of the wire harness W to which the inner cylindrical portion 21 is fitted tightly and a gap between each electric wire Wa and the inner circumference of the inner cylindrical portion 21, and the charged water sealant is hardened to seal the gaps among the electric wires Wa.

The fitting portion 13 of the grommet 10 configured thus is fitted into the opening portion 1 of the panel P. The inner circumferential edge of the opening portion 1 is engaged with the engagement groove 17a of the panel engagement portion 17. Thus, the grommet 10 is attached to the panel P. As a result, the wire harness W is supported on the panel P by the grommet 10. When the grommet 10 is fitted into the opening portion 1 of the panel P in this manner, the opening portion 1 is closed by the grommet 10.

Next, a method for manufacturing the grommet 10 will be described.

In the method for manufacturing the grommet according to the embodiment, first, the thicknesses and the number of soundproof walls 20 in the grommet 10 to be manufactured are designed so that a transmission level of sound pressure can be suppressed by at least 3 dB in a frequency band not lower than 1,000 Hz and not higher than 4,000 Hz, as compared with a case where the soundproof walls 20 are absent.

Figure 4A:
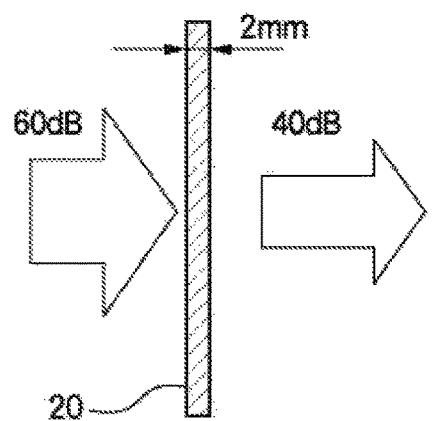
FIGS. 4A, 4B and 4C are views for explaining soundproof performance with soundproof walls, which are schematic sectional views showing the soundproof walls respectively.
Figure 4B:
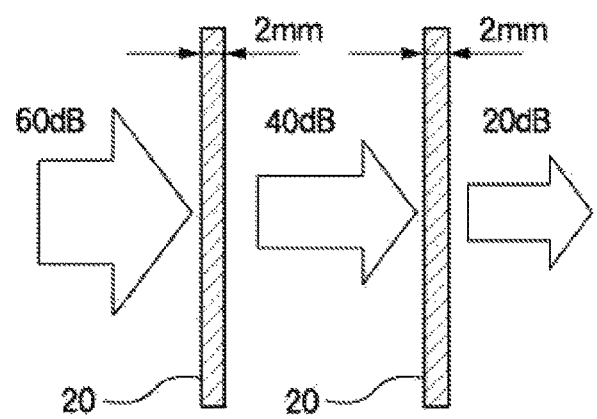
Figure 4C:
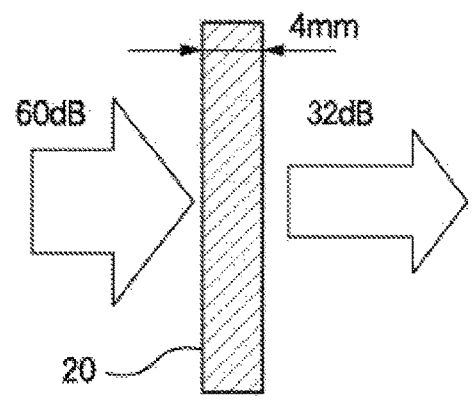

FIGS. 4A, 4B and 4C are views for explaining soundproof performance with soundproof walls, which are schematic sectional views showing the soundproof walls respectively.

The soundproof performance (transmission loss TL) of the grommet can be expressed as:

$$TL = 20\log(\text{surface density } \rho \text{ of structure} \times \text{frequency } f) - 42.5$$

The grommet is typically made of resin. For example, ethylene propylene rubber (EPDM) is used. EPDM has a specific gravity of 0.86 g/cm$^3$. Incidentally, the surface density $\rho$ can be calculated as $\rho$=specific gravity×thickness.

Accordingly, a soundproof effect of a soundproof wall made of EPDM 2 mm (0.002 m) thick in a conversation range (1,000 Hz) can be calculated as:

$$20\log(0.86 \text{ g/cm}^3 \times 1000 \times 0.002 \text{ m} \times 1000 \text{ Hz}) - 42.5 = 22.2 \text{ dB}$$

Therefore, sound can be reduced by about 20 dB whenever it passes through one wall.

In a design in which one soundproof wall 20 having a thickness of 2 mm and having a soundproof effect of 10 dB is disposed, sound of 60 dB can be lowered to 40 dB as shown in FIG. 4A.

For example, in a design in which two soundproof walls 20 configured in the same manner are disposed in parallel, sound of 60 dB can be lowered to 20 dB due to the soundproof effect of 20 dB (10 dB+10 dB) as shown in FIG. 4B. Therefore, a soundproof effect of 40 dB can be expected.

As shown in FIG. 4C, in a design in which one soundproof wall 20 having a thickness of 4 mm which is twice as thick as the aforementioned wall is disposed, sound of 60 dB can be lowered to 32 dB due to a soundproof effect of 28 dB. It can be understood that soundproof performance is higher in a design in which two thin walls are placed than in a design in which one thick wall is placed.

Next, an outer mold and an inner mold for molding the designed grommet 10 are prepared. The grommet 10 is molded using the prepared outer and inner molds. For example, in order to mold the grommet 10 having one soundproof wall 20, two split inner molds for molding the inner shape of the grommet 10 are disposed in a cavity of an outer mold so as to be arranged axially with the soundproof wall 20 as a boundary. A molten material is injected into the cavity. After the material is hardened, the molded grommet 10 is extracted from the outer mold, and the two split inner molds are pulled out axially relatively to the grommet 10.

Here, a grommet according to a reference example will be described.

Figure 5:
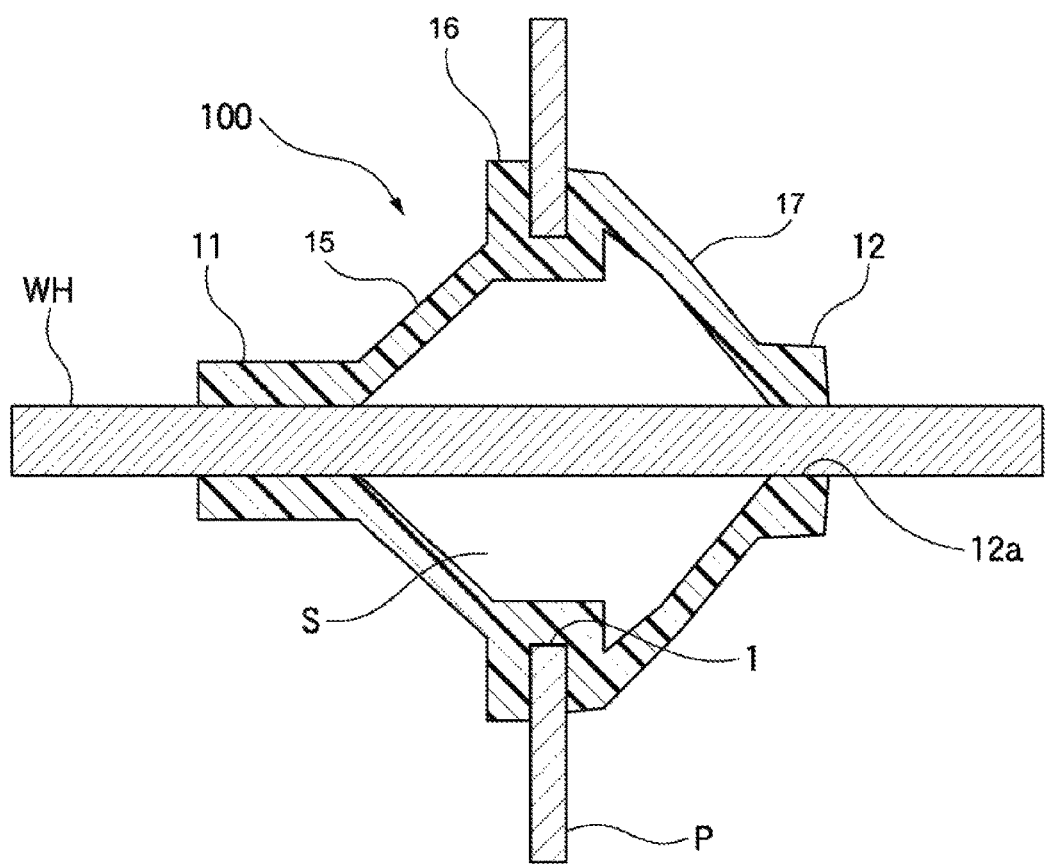
FIG. 5 is a sectional view of a grommet according to a reference example.

FIG. 5 is a sectional view of the grommet according to the reference example. As shown in FIG. 5, the soundproof wall 20 is not provided in a sound shield space S in a grommet 100 according to the reference example. In the grommet 100, sound from the engine room can be reduced by the sound shield space S, but the soundproof effect by the soundproof wall 20 cannot be obtained.

On the other hand, the grommet 10 according to the embodiment has the sound shield space S internally, and further has the soundproof wall 20 inside the sound shield space S. As a result, noise transmitted into the cabin from the engine room through the grommet 10 can be reduced by the two peripheral walls 15 and 16, the soundproof wall 20 and two parts (S1 and S2) of the sound shield space S.

Figure 6:
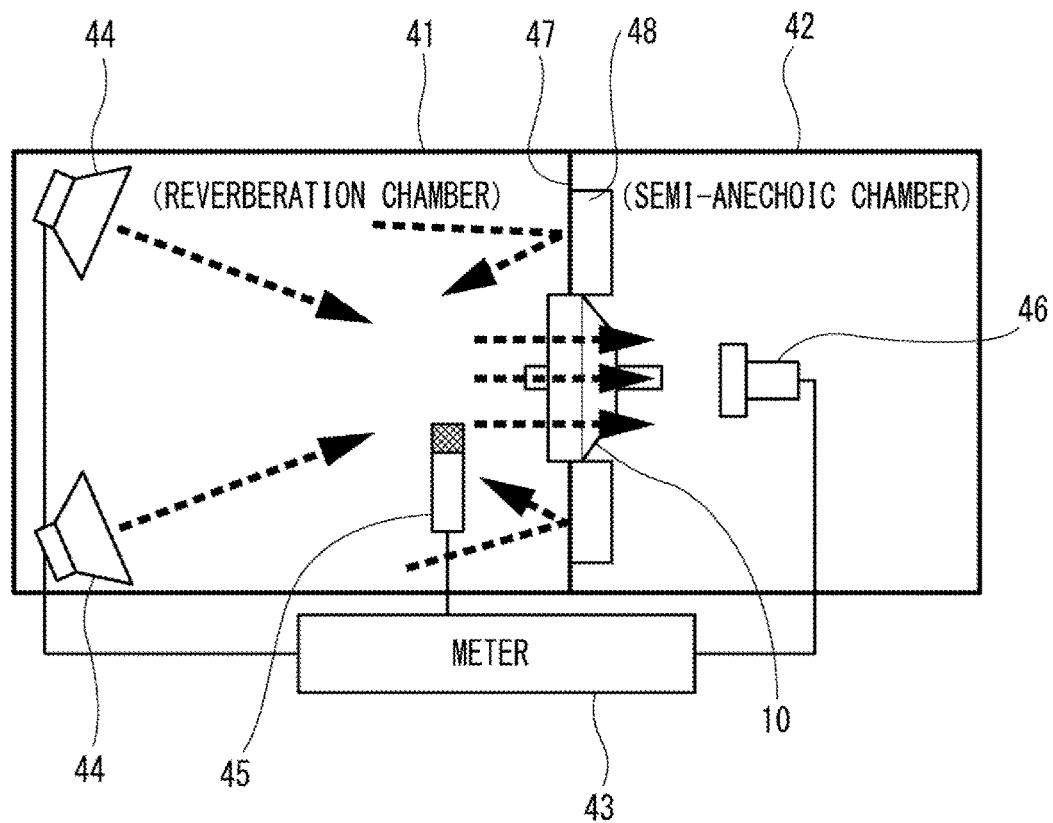
FIG. 6 is a view for explaining a method for measuring soundproof performance of a grommet.

Next, a method for measuring soundproof performance of a grommet will be described with reference to FIG. 6. A partition 47 is provided in a rectangular room to divide the rectangular room into two spaces. One of the spaces, that is, a first space 41 serves as a reverberation room, in which sound absorption is minimized. On the other hand, the other space, that is, a second space 42 serves as a semi-anechoic room or an anechoic room. The reverberation room of the first space 41 imitates an engine room of a car, in which sound is diffused in any direction. On the other hand, the second space 42 serving as a semi-anechoic room or an anechoic room has a structure in which sound is not reflected on any wall. Thus, the second space 42 imitates a cabin.

During running of a vehicle, noise such as engine noise, motor noise or road noise passing through a grommet invades a cabin from an engine room. The grommet is fitted to the partition 47, and a speaker 44 for generating noise simulatively is placed in the first space 41 imitating the engine room. A microphone 45 is also provided in the first space 41. The simulative noise generated from the speaker 44 is collected in the first space 41 by the microphone 45. On the other hand, a microphone 46 for collecting sound having passed through the grommet is provided in the second space 42 imitating the cabin. The sound collected in the first space 41 and the sound collected in the second space 42 are compared by a meter 43 connected to the speaker 44 and the microphones 45 and 46. Thus, soundproof performance of the grommet can be measured. Incidentally, in FIG. 6, a panel 48 is fitted around the grommet, and an outer circumferential portion of the panel 48 is fixed to the partition 47.

Figure 7:
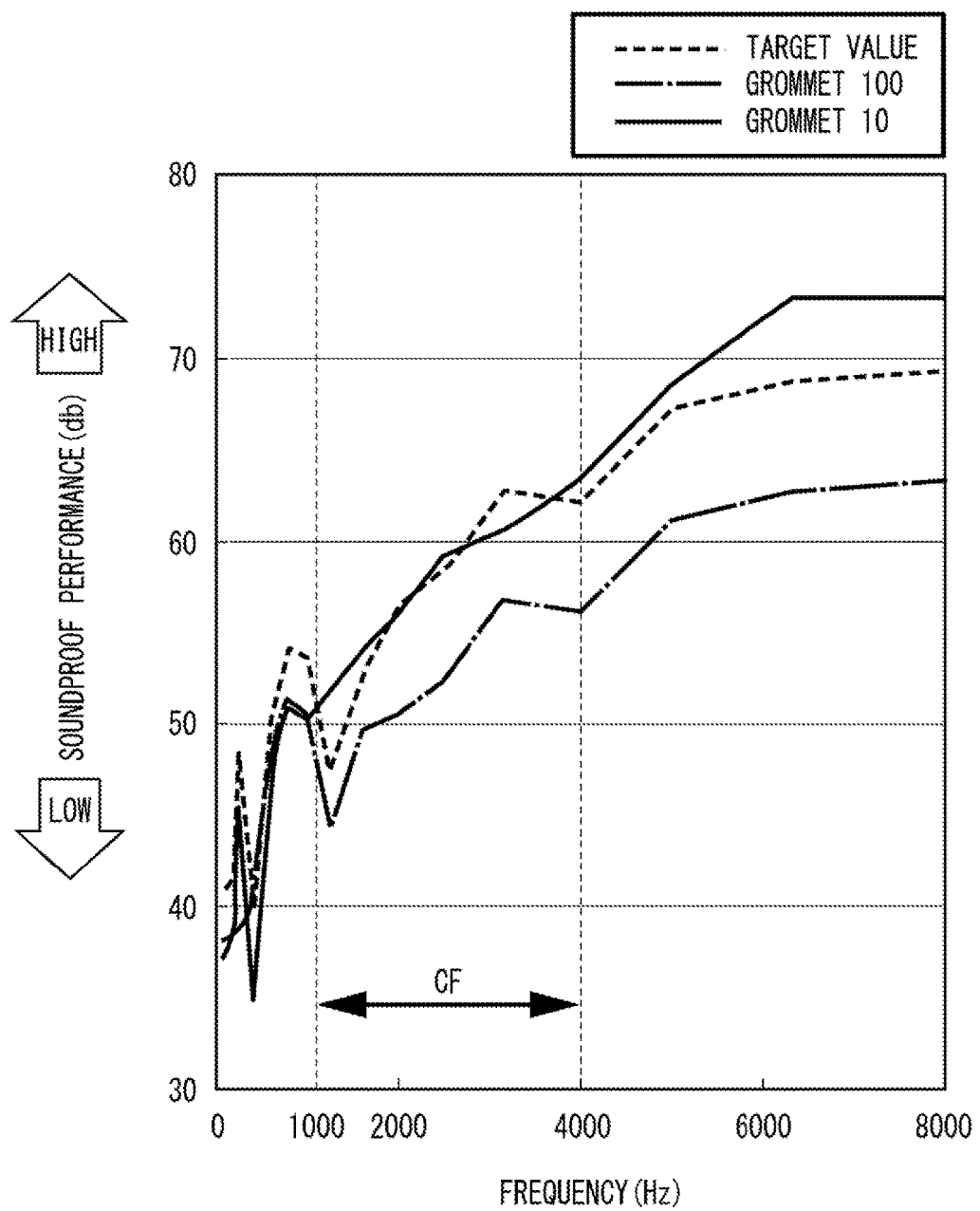
FIG. 7 is a graph for comparison in soundproof performance between the grommet according to the embodiment and the grommet according to the reference example.

FIG. 7 is a graph for comparison in soundproof performance between the grommet according to the embodiment and the grommet according to the reference example.

In recent years, any vehicle has been requested to have a high degree of quietness within a cabin. As shown in FIG. 7, particularly in a frequency band of a conversation range CF not lower than 1,000 Hz and not higher than 4,000 Hz corresponding to a frequency band of sound with which human beings speak, a high target value is requested as soundproof performance required in a grommet (see the broken line in FIG. 7).

In the grommet 100 according to the reference example, in which the soundproof wall 20 is absent, soundproof performance is below the target value in the frequency band of the conversation range CF not lower than 1,000 Hz and not higher than 4,000 Hz. It is desired to improve the soundproof performance (see the alternate long and short dashes line in FIG. 7).

In the grommet 100 having such a structure, the thickness of each peripheral wall 15, 16 may be increased or the grommet 100 may be formed out of a high density material. Thus, the soundproof performance can be enhanced slightly. However, when the thickness of the peripheral wall 15, 16 is increased, it is inevitable to make the grommet 100 larger in size, and the material cost is also increased. On the other hand, when the grommet 100 is formed out of a high density material, the material cost is increased, and the grommet 100 is made heavier in weight. Further, in either case, it is difficult to deform the grommet 100 elastically. Thus, work of attachment to the opening portion 1 of the panel P becomes troublesome.

On the other hand, the grommet 10 obtained by the manufacturing method according to the embodiment is designed and manufactured so that the transmission level of sound pressure can be suppressed by at least 3 dB as compared with a case where the soundproof wall 20 is absent. Accordingly, in the frequency band of the conversation range CF not lower than 1,000 Hz and not higher than 4,000 Hz, the soundproof performance reaches the target value substantially. Thus, excellent soundproof performance can be secured (see the solid line in FIG. 7).

In this manner, according to the method for manufacturing the grommet 10 according to the embodiment, it is possible to obtain the grommet 10 in which sound transmitted from one surface side of the panel P to the other surface side through the opening portion 1 of the panel P can be reduced by the sound shield space S, and further reduced on a large scale by the soundproof wall 20. In addition, the grommet 10 is manufactured as follows. That is, the thicknesses and the number of soundproof walls 20 formed in the sound shield space S are designed so that the transmission level of sound pressure can be suppressed by at least 3 dB in the frequency band of the conversation range CF not lower than 1,000 Hz and not higher than 4,000 Hz corresponding to the frequency band of sound with which human beings speak, as compared with a case where the soundproof walls 20 are absent. Accordingly, when the manufactured grommet 10 according to the embodiment is provided in a dash panel of a vehicle, sound in the frequency band of the conversation range CF not lower than 1,000 Hz and not higher than 4,000 Hz within an engine room can be surely suppressed from being transmitted into a cabin through the opening portion 1. Thus, a comfortable indoor space can be obtained. In addition, it is possible to enhance soundproof performance while suppressing costs and suppressing increase in size and weight in comparison with a case where thickness of each peripheral wall 15, 16 forming an air layer is increased or a grommet is formed out of a high density material in order to enhance the soundproof performance.

In addition, the grommet 10 has a first lip portion 18a and a second lip portion 19a, which push the first surface P1 and the second surface P2 of the panel P when the grommet 10 is attached to the panel P. Accordingly, vibration of the panel P can be suppressed by the first lip portion 18a and the second lip portion 19a when the grommet 10 is attached to the panel P. Thus, sound transmitted by the panel P can be reduced.

Next grommets according to modifications will be described.

Modification 1

Figure 8:
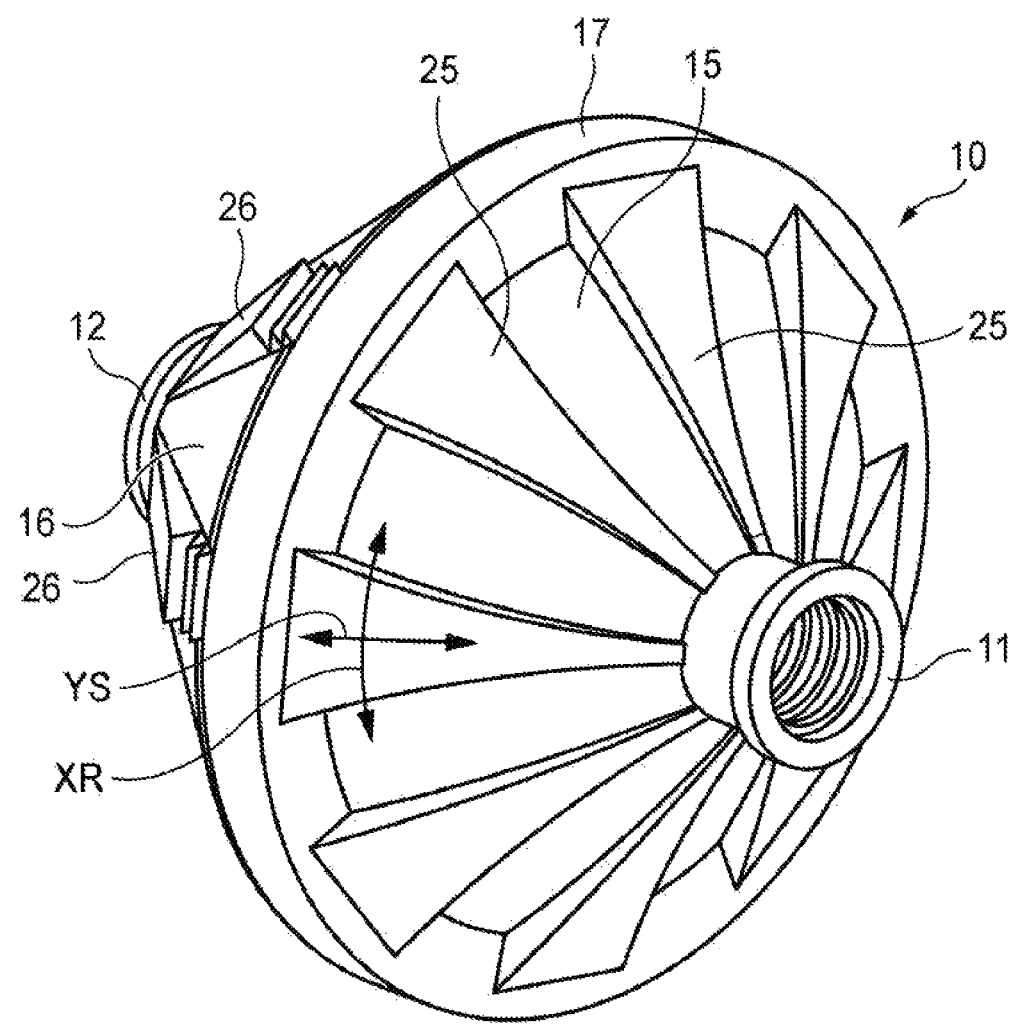
FIG. 8 is a perspective view of a grommet according to Modification 1.

FIG. 8 is a perspective view of a grommet according to Modification 1.

As shown in FIG. 8, convex ribs 25 and 26 for reinforcing the tapered cylindrical peripheral walls 15 and 16 partially are provided to protrude in external surfaces (on wall surfaces) of the peripheral walls 15 and 16 and integrally with the peripheral walls 15 and 16. The ribs 25 and 26 are provided to extend like belts in generatrix directions YS of the external surfaces respectively, and at constant intervals in circumferential directions XR of the peripheral walls 15 and 16 respectively. That is, the ribs 25 and 26 are provided radially in the external surfaces of the tapered cylindrical peripheral walls 15 and 16 respectively. Any number of ribs 25, 26 may be provided as long as it is plural. It is desired to provide three or more ribs 25, 26. In this modification, eight ribs 25, 26 are provided at equal intervals in its circumferential direction XR.

In this Modification 1, the peripheral walls 15 and 16 are not thickened totally, but can be enhanced in rigidity partially only in the portions where the ribs 25 and 26 are located (for example, only in the portions where vibration is apt to occur). Accordingly, vibration in the portions where rigidity has been enhanced can be suppressed so that sound transmitted by the peripheral walls 15 and 16 can be reduced. Thus, soundproof performance can be improved.

Modification 2

In Modification 2, a ratio between axial lengths of the sound shield space parts S1 and S2 divided by the soundproof wall 20 is defined.

In a grommet having a sound shield space S internally, sound waves may be cancelled with each other or resonant amplification of the sound waves may occur on the contrary, due to influence of reflection of sound within the sound shield space S. As a result, sound of a frequency to be easily attenuated by the grommet and sound of a frequency to be easily transmitted by the grommet are present.

For example, conditions in which resonant amplification of sound occurs will be considered using an air column model.

Figure 9A:
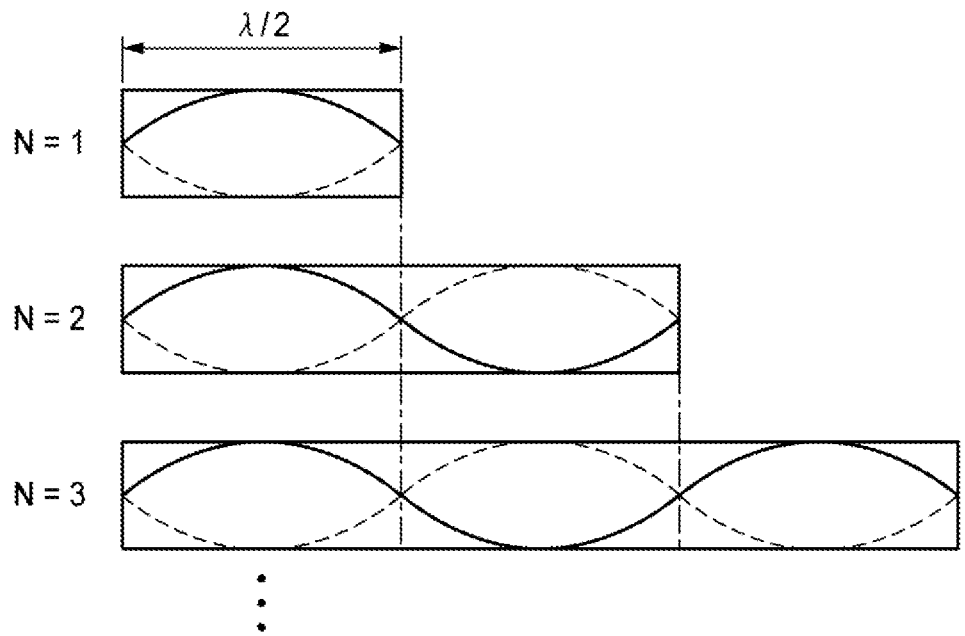
FIGS. 9A and 9B are views for explaining principles in Modification 2 in which axial length of a sound shield space is set, including FIG. 9A which is a view showing conditions in which the sound shield space (using an air column as model) has a function of resonant amplification of sound having a wavelength $\lambda$, and FIG. 9B which is a view showing conditions in which the sound shield space (using an air column as model) has a function of canceling the sound having the wavelength $\lambda$.
Figure 9B:
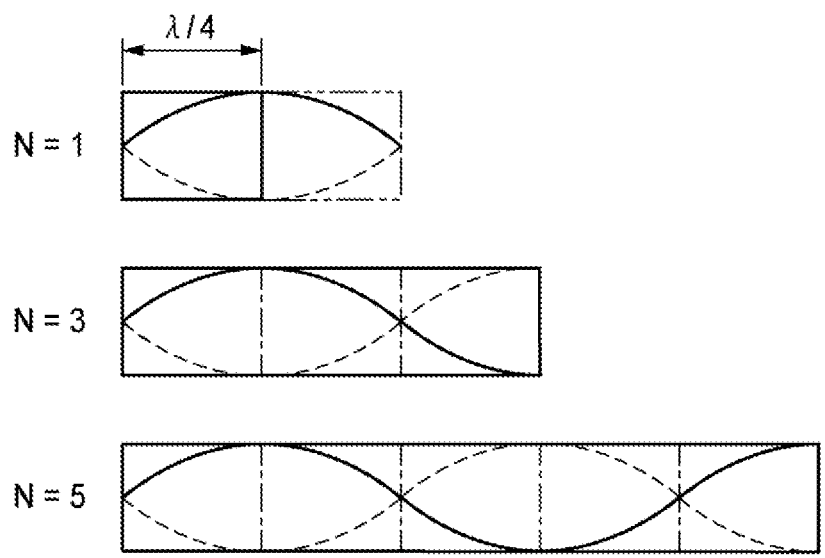

FIGS. 9A and 9B are views for explaining principles in a case in which axial length of a sound shield space is set, including FIG. 9A which is a view showing conditions in which the sound shield space (using an air column as model) has a function of resonant amplification of sound having a wavelength λ, and FIG. 9B which is a view showing conditions in which the sound shield space (using an air column as model) has a function of canceling the sound having the wavelength λ.

In a mode of a both-end closed type air column, as shown in FIG. 9A, a standing wave having nodes at its opposite ends is generated when the air column has a length $L=\lambda/2$ with respect to sound of a wavelength λ. Resonant amplification occurs on this condition. In addition, the same thing occurs when $L=(\lambda/2)\cdot N$ (N=1, 2, 3, . . . ).

On the other hand, consider opposite conditions to the case of resonant amplification. As shown in FIG. 9B, an effect of cancelling by reflected sound occurs when the air column has a length $L=\lambda/4$ with respect to sound of the wavelength λ. Also in this case, the same thing occurs when $L=(\lambda/4)\cdot N$ (N=1, 3, 5, . . . ).

The aforementioned two conditions are expressed by other expressions as:

$$\text{Condition of resonant amplification } f=(cN)/(2L) \quad (1)$$

$$\text{Condition of cancelling } f=(cN)/(4L) \quad (2)$$

Providing, f: frequency (Hz)
L: axial length (m) of sound shield space
c: sound velocity (m/sec)=about 340 m/s
λ: wavelength (m)
N in Expression (1): N=1, 2, 3, . . .
N in Expression (2): N=1, 3, 5, . . .

According to the principles described above with the air column model, it is desired that both the cancelling frequencies in the parts (S1 and S2) of the sound shield space S divided by the soundproof wall 20 belong to a target frequency band to be attenuated in the grommet 10.

For example, assume that, of frequencies of sound to be transmitted into a cabin from the outside of the cabin, a frequency band of sound to be suppressed from being transmitted is 1,000 to 4,000 Hz. In this case, axial lengths of the respective sound shield space parts S1 and S2 are set at lengths L obtained from the aforementioned Expression (2) in which f is set at 1,000 to 4,000. In this manner, transmission of sound in the target frequency band can be suppressed effectively.

On that occasion, it is preferable that conditions of resonant amplification are prevented from overlapping between the sound shield space parts S1 and S2. Specifically, when the sound shield space parts S1 and S2 have different axial lengths, different conditions are set in such a manner that the cancelling frequency in the large sound shield space part is set at 2,000 Hz, and the cancelling frequency in the small sound shield space part is set at 3,000 Hz.

Particularly when the ratio between the length of the large sound shield space part and the length of the small sound shield space part is set at 2:1, sound amplified resonantly in one of the sound shield space parts can be cancelled by the other sound shield space part. Thus, a wide range can be covered.

Figure 10:
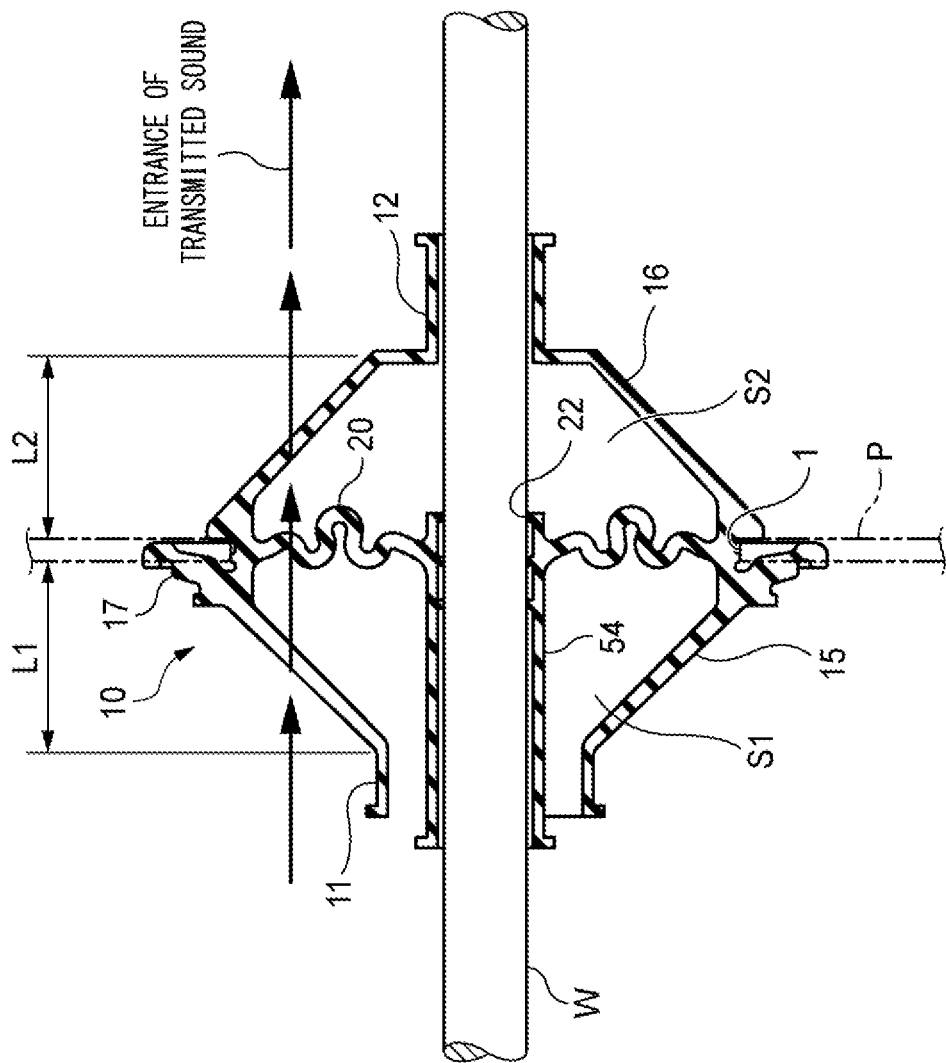
FIG. 10 is a sectional view of the grommet showing an example of specific set dimensions as to the axial lengths of sound shield space parts.

FIG. 10 is a sectional view of the grommet showing an example of specific set dimensions as to the axial lengths of the sound shield space parts.

As shown in FIG. 10, assume that the axial length of the sound shield space part S1 on one side (for example, engine room side) OUT of the panel P from which sound comes in is L1, and the length of the sound shield space part S2 on the other side (for example, cabin side) IN of the panel P is L2. The lengths L1 and L2 are calculated and set from the aforementioned Expression (2) based on the target frequency $\underline{f}$. On that occasion, it is preferable that L1:L2 is set at 2:1. For example, L2 is set at 20 mm when L1 is set at 40 mm.

Practically, it is preferable that the lengths L1 and L2 are optimized by experiments in consideration of the aforementioned principles of resonance and cancelling.

The embodiment has been described above along an example in which the soundproof wall 20 is formed into an annular corrugated wall. However, the soundproof wall 20 may be formed into a flat plate-like shape. Further, the soundproof wall 20 may be inclined with respect to a plane perpendicular to the axis of the wire harness W as shown in the following Modification 3 or 4.

Modification 3

Figure 11:
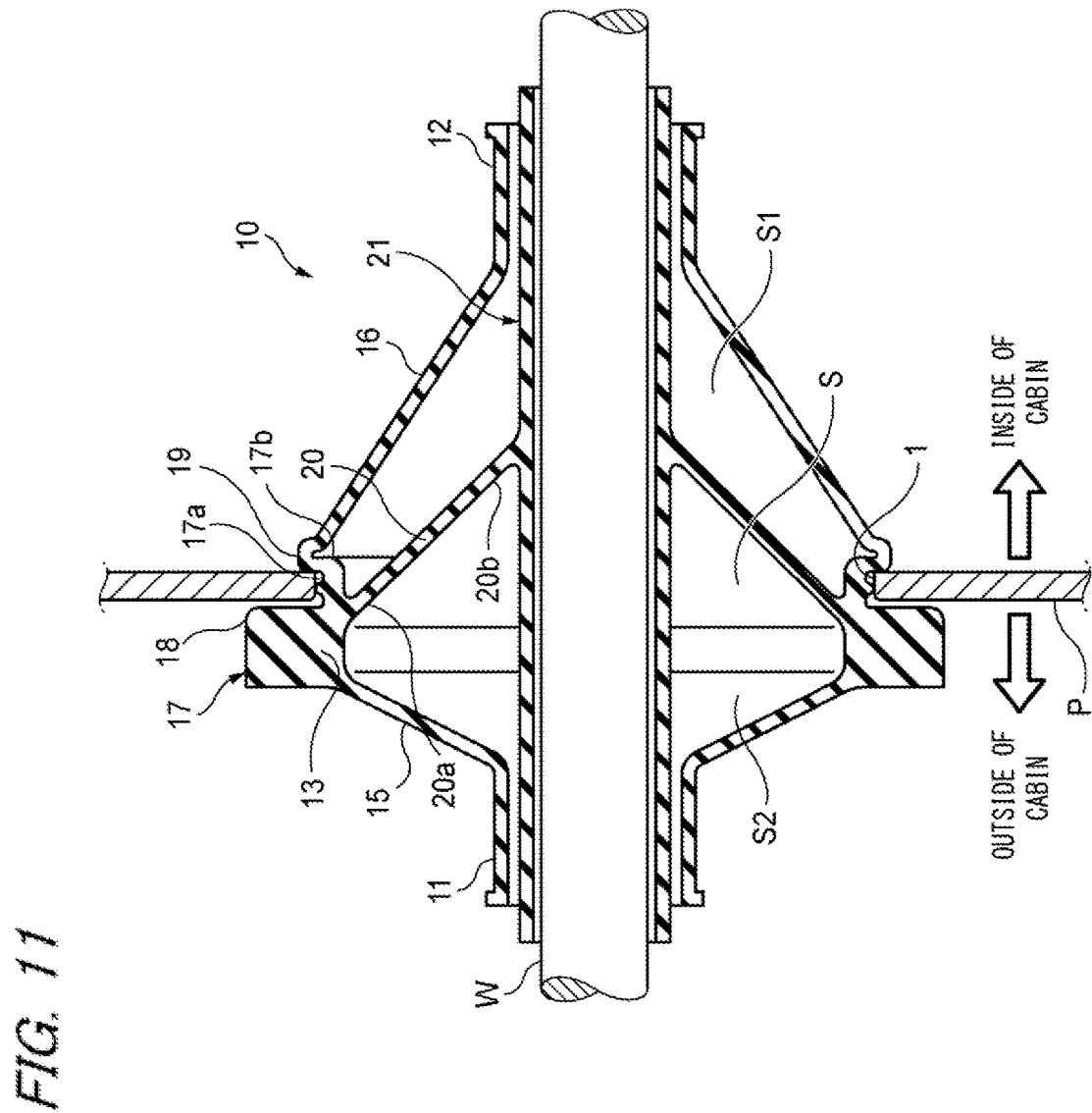
FIG. 11 is a sectional view of a grommet according to Modification 3.

FIG. 11 is a sectional view of a grommet according to Modification 3. In Modification 3, the soundproof wall 20 is formed into a flat plate-like shape, and the outer circumferential end 20a is connected to the inner circumference of the fitting portion 13. In addition, the inner circumferential end 20b is connected to the cabin side of the inner cylindrical portion 21. Accordingly, the soundproof wall 20 is inclined with respect to a plane perpendicular to the axis of the wire harness W.

Incidentally, as shown in FIG. 11, a punched groove portion 17b may be formed so that the grommet 10 can be deformed easily when it is pushed by an edge portion of the opening portion 1 of the panel P. Thus, the insertion force to the opening portion 1 of the panel P can be reduced.

Modification 4

Figure 12:
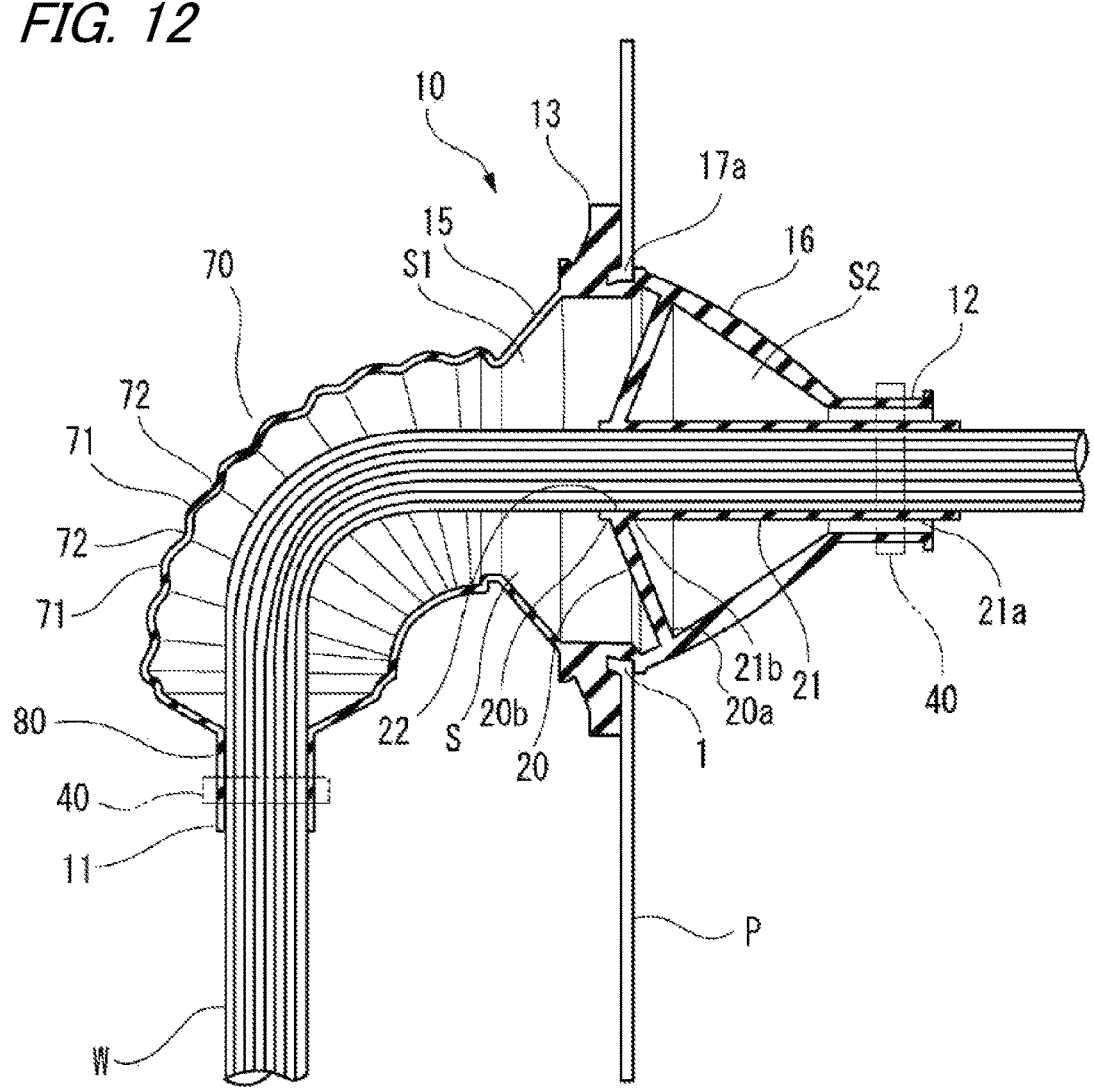
FIG. 12 is a sectional view of a grommet according to Modification 4.

FIG. 12 is a sectional view of a grommet according to Modification 4. Also in Modification 4, the soundproof wall 20 is formed into a flat plate-like shape, and inclined with respect to a plane perpendicular to the axis of the wire harness W.

The grommet 10 according to Modification 4 has a cylindrical portion 70. The cylindrical portion 70 is provided integrally between the inner circumferential end of one peripheral wall 15 and the small diameter cylindrical portion 11. The cylindrical portion 70 has a bellows-like shape in which mountain portions 71 and valley portions 72 extending circumferentially are formed alternately axially. Thus, the cylindrical portion 70 can be bent easily. The cylindrical portion 70 is made long enough to be bent easily so that the small diameter cylindrical portion 11 at an end portion of the cylindrical portion 70 can face downward. For example, the cylindrical portion 70 is made 30 mm to 200 mm long.

In addition, the cylindrical portion 70 in use is bent downward and extended to be long, Thus, the cylindrical portion 70 has a posture in which the small diameter cylindrical portion 11 at the end portion thereof (the end portion facing an environment having a chance of being spattered by water, such as an engine room) is suspended downward. As a result, moisture can be prevented from invading the small diameter cylindrical portion 11 easily due to a capillarity phenomenon among electric wires constituting the wire harness W. In this manner, this part serves as a water stop portion 80.

Incidentally, the invention is not limited to the aforementioned embodiment, but deformations, improvements, etc. can be made suitably. In addition, materials, shapes, dimensions, numbers, arrangement places, etc. of respective constituent elements in the aforementioned embodiment are not limited. Any materials, any shapes; any dimensions, any numbers, any arrangement places, etc. may be used as long as the invention can be attained.

Here, the features of the aforementioned embodiment of a method for manufacturing a grommet; and a grommet according to the invention will be summarized and listed briefly in the following paragraphs [1] to [5].

[1] A method for manufacturing a grommet (10), which is fixed to a wire harness (W) inserted into an opening portion (1) of a panel (P) and which is fitted and attached to the opening portion (1) to thereby support the wire harness (W) on the panel (P), the grommet (10) including:

a peripheral wall (15, 16) that surrounds the wire harness (W) to form a sound shield space (S) around the wire harness (W); and a soundproof wall (20) that is formed in the sound shield space (S) so as to cross a longitudinal direction of the wire harness (W); wherein:

the soundproof wall (20) is designed by:

$$TL = 20 \log(\rho \times f) - 42.5$$

where TL designates transmission loss of the soundproof wall, λ designates surface density of the soundproof wall, and f designates a frequency.

[2] A method for manufacturing a grommet according to the paragraph [1] wherein:

the soundproof wall is designed so that the transmission loss TL satisfies:

$$TL \geq 20$$

at least in a part of a frequency band not lower than 1,000 Hz and not higher than 4,000 Hz.

[3] A method for manufacturing a grommet (10), which is fixed to a wire harness (W) inserted into an opening portion (1) of a panel (P) and which is fitted and attached to the opening portion (1) to thereby support the wire harness (W) on the panel (P), the grommet (10) including:
    a peripheral wall (15, 16) that surrounds the wire harness (W) to form a sound shield space (S) around the wire harness (W); and
    soundproof walls (20) that are formed in the sound shield space (S) so as to cross a longitudinal direction of the wire harness (W); wherein:
    thickness of each of the soundproof walls (20) and a number of the soundproof walls (20) are designed so that a sound pressure level transmitted by the panel (P) can be suppressed by at least 3 dB in a frequency band not lower than 1,000 Hz and not higher than 4,000 Hz in comparison with that in a case where the soundproof walls (20) are absent.

[4] A method for manufacturing a grommet according to the configuration [1], the grommet further including:
    a panel engagement portion (17) that can be engaged with an inner circumferential edge of the opening portion (1) of the panel (P); wherein:
    the panel engagement portion (17) includes a first side wall (18) and a second side wall (19) that are opposed to each other to form an engagement groove (17a) to which the panel (P) can be fitted;
    a first lip portion (18a) is formed in the first side wall (18) so that the first lip portion (18a) can abut against a first surface (P1) of the panel (P) to push the panel (P) toward the second side wall (19); and
    a second lip portion (19a) is formed in the second side wall (19) so that the second lip portion (19a) can abut against a second surface (P2) of the panel (P) to push the panel (P) toward the first side wall (18), the second surface (P2) being an opposite surface to the first surface (P1).

[5] A grommet (10) which is fixed to a wire harness (W) inserted into an opening portion (1) of a panel (P) and which is fitted and attached to the opening portion (1) to thereby support the wire harness (W) on the panel (P), the grommet (10) comprising:
    a peripheral wall (15, 16) that surrounds the wire harness (W) to form a sound shield space (S) around the wire harness (W);
    a soundproof wall (20) that is formed in the sound shield space (S) so as to cross a longitudinal direction of the wire harness (W); and
    a panel engagement portion (17) that can be engaged with an inner circumferential edge of the opening portion (1) of the panel (P); wherein:
    the panel engagement portion (17) includes a first side wall (18) and a second side wall (19) that are opposed to each other to form an engagement groove (17a) to which the panel (P) can be fitted;
    a first lip portion (18a) is formed in the first side wall (18) so that the first lip portion (18a) can abut against a first surface (P1) of the panel (P) to push the panel (P) toward the second side wall (19); and
    a second lip portion (19a) is formed in the second side wall (19) so that the second lip portion (19a) can abut against a second surface (P2) of the panel (P) to push the panel (P) toward the first side wall (18), the second surface (P2) being an opposite surface to the first surface (P1).

What is claimed is:

1. A grommet which is fixed to a wire harness inserted into an opening portion of a panel and which is fitted and attached to the opening portion to thereby support the wire harness on the panel, the grommet including:
    a fitting portion fitted into the opening portion of the panel;
    a pair of peripheral walls that extend on axially opposite sides from the fitting portion and surround the wire harness to form a sound shield space around the wire harness;
    a soundproof wall provided on an inner circumference of the fitting portion and formed in the sound shield space between the pair of peripheral walls so as to cross a longitudinal direction of the wire harness; and
    a panel engagement portion that can be engaged with an inner circumferential edge of the opening portion of the panel; wherein:
    the panel engagement portion includes a first side wall and a second side wall that are opposed to each other to form an engagement groove to which the panel can be fitted;
    a first lip portion is formed in the first side wall so that the first lip portion can abut against a first surface of the panel to push the panel toward the second side wall;
    a second lip portion is formed in the second side wall so that the second lip portion can abut against a second surface of the panel to push the panel toward the first side wall, the second surface being an opposite surface to the first surface, and
    wherein a thickness of each of the soundproof walls and one or two of the soundproof walls are designed so that a sound pressure level transmitted by the panel can be suppressed by at least 3 dB in a frequency band not lower than 1,000 Hz and not higher than 4,000 Hz in comparison with that in a case where the soundproof walls are absent.

2. The grommet of claim 1, wherein the soundproof wall is formed as an annular wall plate formed into a corrugated shape made of concentric circles.

3. A method for manufacturing a grommet, which is fixed to a wire harness inserted into an opening portion of a panel and which is fitted and attached to the opening portion to thereby support the wire harness on the panel, the grommet including:
    a fitting portion fitted into the opening portion of the panel;
    a pair of peripheral walls that extend on axially opposite sides from the fitting portion toward the wire harness and surround the wire harness to form a sound shield space therebetween and around the wire harness; and
    a soundproof wall provided on an inner circumference of the fitting portion and formed in the sound shield space and between the pair of peripheral walls so as to cross a longitudinal direction of the wire harness; wherein:
    the soundproof wall is designed by:

$$TL = 20 \log(\rho \times f) - 42.5$$

where TL designates transmission loss of the soundproof wall, p designates surface density of the soundproof wall, and f designates a frequency,
    wherein a sound pressure level transmitted by the panel can be suppressed by at least 3 dB in a frequency band not lower than 1,000 Hz and not higher than 4,000 Hz in comparison with that in a case where the soundproof walls are absent.

4. The method for manufacturing a grommet according to claim 3, wherein:
    the soundproof wall is designed so that the transmission loss TL satisfies:

$$TL \geq 20$$

at least in a part of a frequency band not lower than 1,000 Hz and not higher than 4,000 Hz.

5. A method for manufacturing a grommet, which is fixed to a wire harness inserted into an opening portion of a panel and which is fitted and attached to the opening portion to thereby support the wire harness on the panel, the grommet including:
- a fitting portion fitted into the opening portion of the panel;
- a pair of peripheral walls that extend on axially opposite sides from the fitting portion toward the wire harness and surround the wire harness to form a sound shield space therebetween and around the wire harness; and
- soundproof walls provided on an inner circumference of the fitting portion and formed in the sound shield space and between the pair of peripheral walls so as to cross a longitudinal direction of the wire harness; wherein:
- thickness of each of the soundproof walls and one or two of the soundproof walls are designed so that a sound pressure level transmitted by the panel can be suppressed by at least 3 dB in a frequency band not lower than 1,000 Hz and not higher than 4,000 Hz in comparison with that in a case where the soundproof walls are absent.

6. A method for manufacturing a grommet according to claim 3, the grommet further including:
- a panel engagement portion that can be engaged with an inner circumferential edge of the opening portion of the panel; wherein:
- the panel engagement portion includes a first side wall and a second side wall that are opposed to each other to form an engagement groove to which the panel can be fitted;
- a first lip portion is formed in the first side wall so that the first lip portion can abut against a first surface of the panel to push the panel toward the second side wall; and
- a second lip portion is formed in the second side wall so that the second lip portion can abut against a second surface of the panel to push the panel toward the first side wall, the second surface being an opposite surface to the first surface.

7. A method for manufacturing a grommet according to claim 5, the grommet further including:
- a panel engagement portion that can be engaged with an inner circumferential edge of the opening portion of the panel; wherein:
- the panel engagement portion includes a first side wall and a second side wall that are opposed to each other to form an engagement groove to which the panel can be fitted;
- a first lip portion is formed in the first side wall so that the first lip portion can abut against a first surface of the panel to push the panel toward the second side wall; and
- a second lip portion is formed in the second side wall so that the second lip portion can abut against a second surface of the panel to push the panel toward the first side wall, the second surface being an opposite surface to the first surface.

8. The method for manufacturing a grommet of claim 3, wherein the soundproof wall is formed as an annular wall plate formed into a corrugated shape made of concentric circles.

9. The method for manufacturing a grommet of claim 8, wherein the corrugated shape includes a bellows-like shape.

10. The method for manufacturing a grommet of claim 5, wherein the soundproof wall is formed as an annular wall plate formed into a corrugated shape made of concentric circles.

11. The method for manufacturing a grommet of claim 10, wherein the corrugated shape includes a bellows-like shape.

12. The grommet of claim 2, wherein the corrugated shape includes a bellows-like shape.

* * * * *